United States Patent [19]

Stella et al.

[11] 4,265,525

[45] May 5, 1981

[54] DISC CAMERA

[75] Inventors: Joseph A. Stella, Peabody; Joseph H. Wright, Marblehead, both of Mass.

[73] Assignee: Polaroid Corporation, Cambridge, Mass.

[21] Appl. No.: 106,766

[22] Filed: Dec. 26, 1979

[51] Int. Cl.³ .................... G03B 17/52; G03B 29/00
[52] U.S. Cl. ................................. 354/76; 354/86; 354/121
[58] Field of Search .................. 354/75–78, 354/83–86, 121, 174, 175, 275, 276, 180, 182

[56] References Cited

U.S. PATENT DOCUMENTS

| | | |
|---|---|---|
| 2,531,653 | 11/1950 | Tait et al. |
| 2,625,087 | 1/1953 | Steineck ........................... 354/121 |
| 2,854,903 | 10/1958 | Land et al. ........................ 354/78 |
| 3,446,131 | 5/1969 | Cook et al. |
| 3,537,370 | 11/1970 | Wareham |
| 4,081,806 | 3/1978 | Seckendorf ...................... 354/121 |
| 4,086,604 | 4/1978 | Douglas ........................... 354/219 |
| 4,114,166 | 9/1978 | Driscoll et al. ................... 354/76 |
| 4,194,822 | 3/1980 | Sethi ................................. 354/121 |

OTHER PUBLICATIONS

"Research Disclosure", Aug. 1978, pp. 97–110.

*Primary Examiner*—John Gonzales
*Attorney, Agent, or Firm*—David R. Thornton

[57] ABSTRACT

Photographic apparatus including a miniature camera for exposing, processing and viewing small format positive image transparencies. A film cassette carries a plurality of film units of a type in which each unit includes a self-contained pod of processing fluid. After exposure of a given film unit, that unit is moved from an exposure position, past a spreader bar to spread processing fluid over the exposed area of the film unit and to a viewing position in which the processed film unit is presented in a camera window through which it may be examined by light passing through the camera window and the film unit.

13 Claims, 11 Drawing Figures

DISC CAMERA

BACKGROUND OF THE INVENTION

This invention relates to photographic apparatus and more particularly, it concerns an instant camera and film assembly by which positive film transparencies are provided with a pocket-size camera in which photographic film is exposed, processed and the resulting transparency viewed without removal of the film assembly from the camera.

Small or pocket-size photographic cameras are popular among travelers and other amateur photographers who are disinclined to the bother of carrying or handling photographic equipment which detracts from personal enjoyment of a vacation or entertainment objective. Camera miniaturization, however, is not without compromise either of camera cost, quality of pictures taken or both. In connection with picture quality, instant cameras are often preferred by travelers because of the facility they offer for retaking an important scene to assure the photographer of attaining the photograph he or she desires.

Heretofore, instant cameras have been bulky in the context of miniature cameras principally because of their design to accommodate a positive print format of a size much larger than the negative size format of a small camera in which the film is exposed for subsequent laboratory processing. However, photographic films are now available which may be exposed and processed to provide a viewable positive transparency after application of a thin layer of processing fluid over the exposed film. Such film is exemplified by the cassette-contained film strip used in an instant motion picture system commercially available under the name "POLAVISION", a registered trademark of Polaroid Corporation, Cambridge, Massachusetts. The "POLAVISION" film is processed after exposure merely by rewinding the film strip so that it passes under a cassette-contained supply of processing fluid to coat the light sensitive chemicals of the strip with a thin layer of the processing fluid. After a short imbibition period during which the processing fluid reacts with the exposed chemical layers on the film strip, the film strip may be projected for viewing.

In light of such recent developments of instantly processable photographic film, there exists a potential for miniature still cameras by which a photographer may expose and process a plurality of positive image frames on a film strip of the type mentioned. To achieve the full advantages of instant photography, however, it is necessary that each image frame be processed after exposure to allow the photographer to rephotograph a subject in the event the first photograph was inadequate. A continuous film strip of the type used in "POLAVISION" would not provide this capability.

SUMMARY OF THE PRESENT INVENTION

In accordance with the present invention, a highly compact photographic apparatus is provided by which each of a plurality of small format film units may be exposed, processed and viewed prior to the exposure of a successive one of the plurality of film units. The film units are preferably of the type by which each unit includes a self-contained pod of processing fluid capable of being ruptured under pressure and spread over the image format area of the unit in a manner well known in the instant photography art. Film units are supported in spaced relation on a carrier forming part of a film cassette receivable at least partially in a camera having a light-tight housing and an optical system for exposing each film unit to a light image of a subject to be photographed. The carrier is movable to advance each film unit to an exposure position relative to the camera optical system and then from that exposure position to a spaced viewing position. A camera supported spreader bar or equivalent engages the film unit during such movement to spread the unit-contained processing fluid over the exposed area of the film unit. A blind may be provided on the camera or on the film cassette to protect unprocessed film units from accidental exposure to light.

A principal object of the present invention is, therefore, the provision of a compact camera and film cassette by which a plurality of individual film units may be exposed, processed and viewed without exposure of other of the plurality of film units. Other objects and further scope of applicability of the invention will become apparent from the detailed description to follow taken in conjunction with the accompanying drawings.

DETAILED DESCRIPTION OF THE PREFERRED EMBODIMENTS

Figure 1:
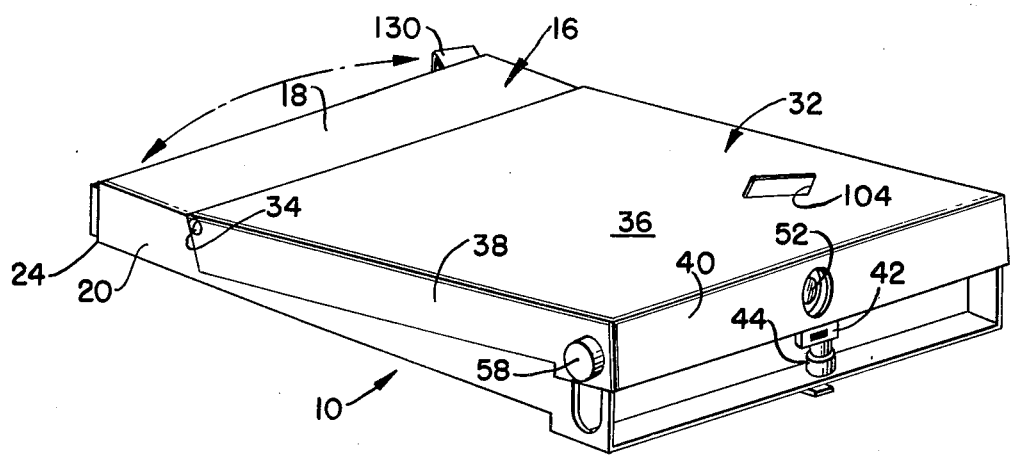
FIG. 1 is a perspective view illustrating the exterior of a camera forming part of the invention.

In FIGS. 1–9 of the drawings, a preferred embodiment of the invention is shown to include a foldable camera 10 of generally rectangular parallelepiped configuration and a film cassette 12 for supporting a plurality of film units 14. The construction of the camera 10 is illustrated most clearly in FIGS. 1–3 of the drawings to provide a housing defined by a body 16 having rectangular top, side and bottom walls 18, 20 and 22, respectively. The back 24 of the body 16 is open and defined essentially by the rear edges of the top, side and bottom walls. A front body wall 26 extends between the sidewalls 20 and is inclined upwardly and forwardly from a depressed nose portion 28 in the bottom wall 22 to the plane of the top wall 18 as shown most clearly in FIGS. 1 and 3. Also, in FIG. 3 it will be noted that the top wall 18 terminates in a front edge 30 spaced from the front wall 26 to provide a rectangular opening circumscribed by the edge 30, the forward portion of the sidewalls 20 and the front wall 26.

The housing of the camera 10 further includes a cover member 32 hinged from the sidewalls 20 of the body 16 by suitable pivot means such as pintles 34. The cover member 32 includes a top wall 36 as well as side and front walls 38 and 40 which overlie and make a light seal with the side and front walls 20 and 26, respectively of the body 16. Pivotal movement of the cover member 32 is between an open or erected position shown in FIGS. 1 and 3 and a collapsed or closed position in which the cover member is substantially coextensive with the body 16. A latch 42 is provided to secure the cover member in its collapsed or closed position. A compression spring 44 biases the cover member to the open or erect position upon release of the latch 42. A shutter and lens mounting block or bar 46 extends between the sidewalls 38 and is secured behind the front wall 40 of the cover member 32. The block 46 is provided with a rearwardly and downwardly inclined light sealing and abutment surface 48 for engaging the inclined front wall 26 of the body 16 and thus establish the position to which the cover member 32 is advanced by the spring 44.

Figure 3:
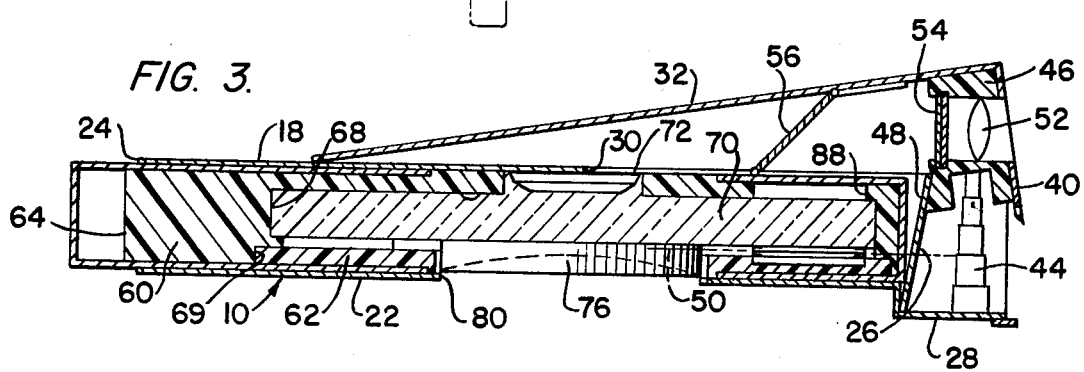
FIG. 3 is an enlarged cross-section on line 3—3 of FIG. 2.

As shown most clearly in FIG. 3, the camera 10 is provided with an optical system by which a light image of a subject to be photographed may be formed at a focal plane 50. The system includes an objective lens 52 and shutter 54 mounted in the block 46. A mirror 56 is hinged from the interior top wall 36 of the cover member 32 and positioned upon movement of the cover 32 to its erect condition so that light passed by the lens 52 will be reflected downwardly to the focal plane 50. A shutter button 58 extends through the sidewall 38 of the cover member 32 near the front wall 40. The button 58 extends into the block 46 and is associated with shutter actuating means (not shown) by which the shutter blades 54 may be operated in a known manner.

Figure 2:
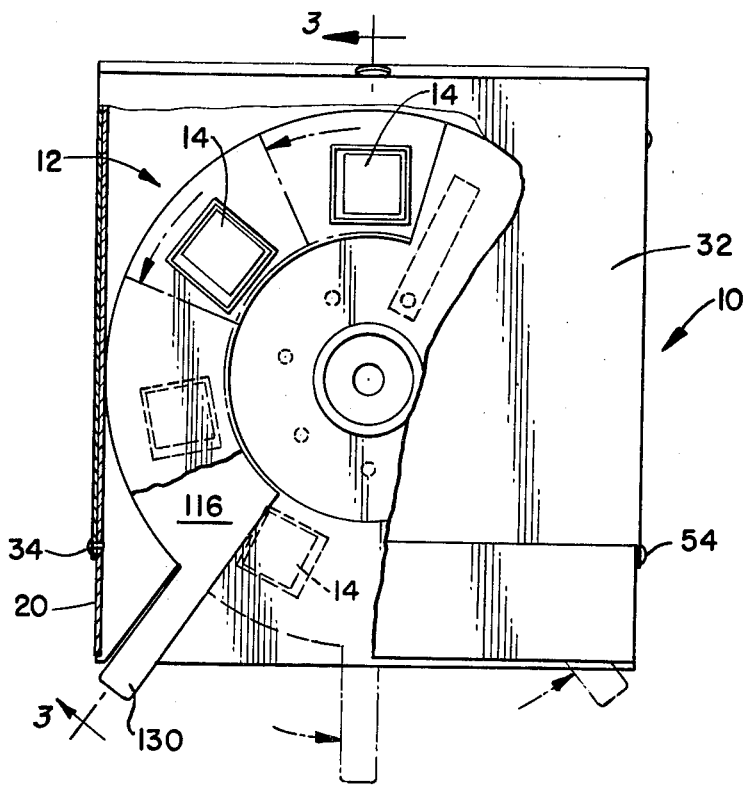
FIG. 2 is a cutaway plan view of the camera shown in FIG. 1 to illustrate the arrangement of film units received in the camera.
Figure 4:
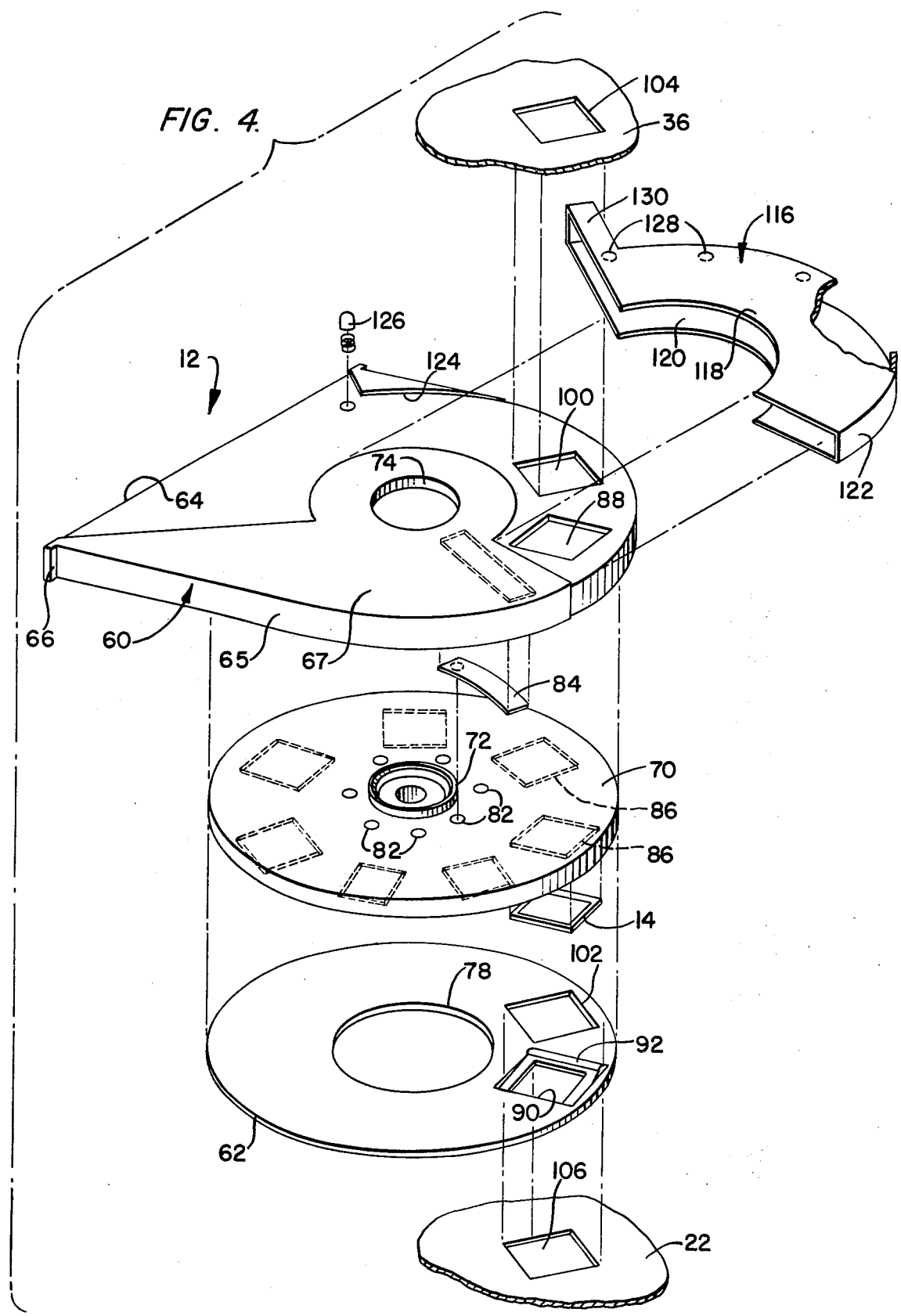
FIG. 4 is an exploded perspective view illustrating the components of a film cassette forming part of the invention.
Figure 5:
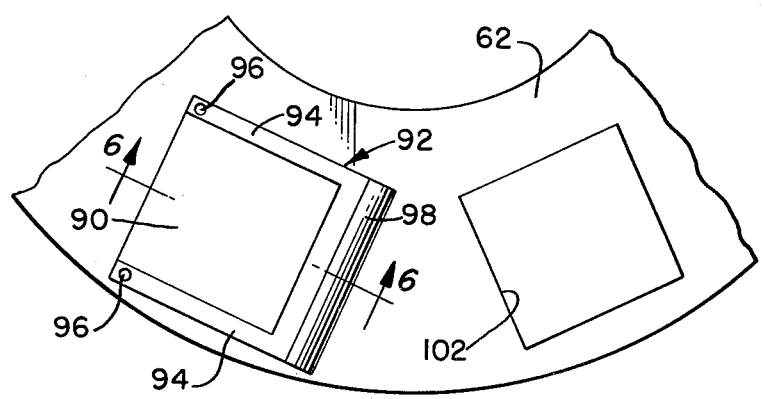
FIG. 5 is a fragmentary plan view illustrating an embodiment of a processing fluid spreader incorporated in the apparatus of the invention.
Figure 6:
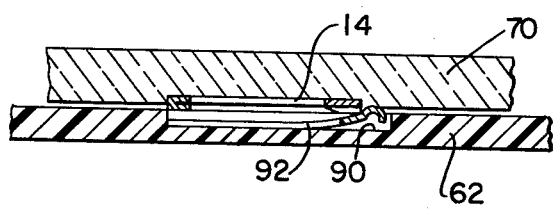
FIG. 6 is a fragmentary cross-section on line 6—6 of FIG. 5.

The construction of the film cassette 12 may be understood by reference to FIGS. 2-4 of the drawings. As shown most clearly in FIG. 4, the cassette 12 includes an opaque housing defined in major part by an upper body member 60 of opaque material and by an opaque bottom wall or closure member 62 of circular disc-like configuration. As may be seen in FIGS. 3 and 4, the body part 60 of the cassette is shaped to include a generally planar rear edge 64 and a continuous exterior side edge 65 which extends linearly at right angles to the rear edge 64 and merges in a sidewall extending about a semicircular front portion. Stop lugs 66 project from the side edge 65 near the rear edge 64. The body part 60 has a top wall 67 and is hollowed by a relatively large diameter circular bore 68 and a counterbore 69 in which the cover disc 62 may be secured in the completed cassette 12 by chemical, thermal or ultrasonic fusion.

Receivable in the cylindrical bore 68 or interior chamber of the film housing is a film unit carrier in the form of a disc-like turret 70 of transparent plastic material having good light transmitting characteristics. Again as shown in FIGS. 3 and 4, the carrier 70 is provided with an upwardly projecting central hub 72 to be journalled in a central aperture 74 in the top of the housing body part 60. An indexing knob 76, rendered opaque by coating or impregnation with appropriate dyes, extends downwardly from the center of the carrier 70 through an opening 78 in the bottom film pack housing disc 62 to be presented in an opening 80 in the bottom wall 22 of the camera housing body 16. A plurality of indexing detents 82 are located in the top surface of the carrier to be engaged by a detent spring 84 secured in the body part 60.

Formed in the bottom surface of the carrier 70 are a plurality of relatively shallow, rectangular film unit pockets 86. The pockets 86 are oriented in a circle concentric with the central axis of the carrier 70 and equally spaced angularly at positions correlated to positions at which the carrier is indexed by the detents 82 and the detent spring 84. Each pocket 86 is dimensioned to receive a film unit 14 for exposure, processing and viewing in a manner to be described in more detail below.

The top wall 67 of the opaque cassette housing part 60 is provided with an exposure window 88 positioned so that when the cassette 12 is positioned in the camera 10, the window 88 is aligned with the camera optical system, specifically in the light path defined by the lens 52 and the mirror 56. The opaque bottom closure member or disc 62 is provided with a rectangular recess 90 in which a spreader bar spring 92 is positioned. As may be seen most clearly in FIGS. 5, 6, 8, and 9, the recess 90 does not extend through the thickness of the bottom closure disc 62 and is of a size slightly larger than the exposure window 88 and of the film unit pockets 86. The spreader bar spring 92 is of generally U-shaped configuration to provide a pair of arcuate leaf spring legs 94 secured at their ends by screws 96 in the disc 62. The base of the U-shaped spring is provided with an upwardly projecting or convex spreader bar portion 98 urged by the spring legs 94 upwardly out of the top plane of the disc 62. The window 88 and the recess 90 are functionally aligned in the assembled housing and provide an exposure position to which each of the film unit pockets 86 may be advanced in use by rotation of the knob 76 and thus of the carrier 70 to successive positions determined by the detents 82 and detent spring 84.

Spaced from the exposure window 88 in the top wall 67 of the cassette body part 60 by one index position is a rectangular window 100 of a size corresponding with the image format area of the film units 14. The window 100 is aligned with a similar window 102 in the bottom closure part or disc 62 of the film cassette 12. The top wall 36 of the camera cover member 32 and the bottom wall 22 of the camera body 16 are similarly provided with rectangular windows 104 and 106, respectively. The windows 104 and 106, as indicated by the sight lines in FIG. 4 of the drawings, are aligned with the windows 100 and 102 in the opaque film housing 12 such that light may pass through the window 106, the window 102, a film unit positioned in alignment therewith, the window 100 and the window 104. As a result of these aligned window openings, the film unit may be viewed without removal from the camera.

Figure 7:
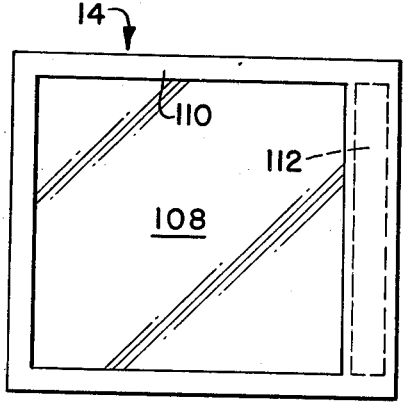
FIG. 7 is an enlarged plan view of a film unit adapted for use with the apparatus of the invention.
Figure 8:
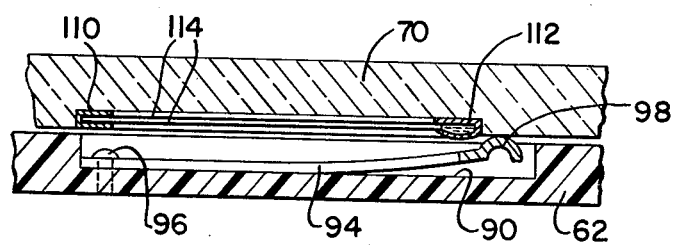
FIGS. 8 and 9 are cross-sectional views similar to FIG. 6 and depicting relative movement of the film unit and the spreader bar during processing.
Figure 9:
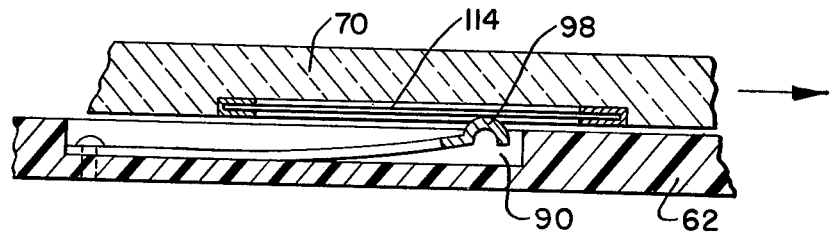

In FIGS. 7-9, a preferred embodiment of each film unit 14 is shown to include a rectangular image receiving area 108 surrounded by a frame 110 of paper or similar material. One marginal edge of the frame 110 is increased in thickness to house a pod 112 of processing fluid in a manner now well known in the art. The image receiving area 108 of the film unit 14 is defined by a pair of transparent sheets of synthetic resinous material such as Mylar so that an image formed in chemical materials supported between the two sheets 114, after exposure and processing by rupturing the pod 112 and spreading the processing fluid therein between the sheets, will be presented as a positive image transparency. The units are secured in the pockets 86 by snap-fit or by marginal bonding, for example.

To prevent accidental exposure of the film units 14 while in the cassette 12 prior to its being inserted in the camera and also to prevent accidental or unwanted exposure of a film unit positioned in alignment with the windows 104 and 106 prior to exposure, an arcuate blind member 116 is adapted to be mounted on the film cassette 12. The blind 116 is of opaque material and, as shown in FIGS. 3 and 4, is provided with spaced top and bottom walls 118 and 120 joined by an outer arcuate edge wall 122. The top wall 67 of the cassette 60 as well as the bottom closure 62 are provided with an arcuate recess 124 into which the blind 116 may be snap-fitted for movement in an arc concentric with the center of the turret 70. A detent plug and spring assembly 126 in the housing part 60 engages detents 128 in the blind 116 to retain position the blind in any one of three angular positions. Also it will be noted that a handle portion 130 extends from the blind in a position to project through the open back of the camera 10 when the film cassette 12 is inserted in the camera.

As will be appreciated from the illustration in FIGS. 3 and 4 of the drawings, the cassette 12 may be assembled by securing the film units 14 in the respective pockets 86 of the turret or carrier 70, inserting the assembled carrier into the bore or chamber 68 and then securing the cover member 62 in place in the counterbore 69. The blind 116 is then snapped in place and moved into a position in which it covers both windows 88 and 100 in the top wall of the cassette body part 60. The turret carrier 70 may be rotated until the detent spring 84 engages in any one of the detents 82 to position any one of the film units under the exposure window 88.

In use, the cassette 12 is inserted through the open rear edge of the camera 10 with the blind 116 in a position covering the exposure window 88 as well as the window 100. The angular position of the blind handle 130 in this condition is shown in solid lines in FIG. 2 of the drawings. The lugs 65 at the rear edge of the cassette will indicate the fully inserted condition of the cassette. Once the film units are protected from light by reception of the cassette 12 in the camera 10, the blind 116 may be adjusted by manipulation of the handle 130 so that it is swung clear of the exposure window 88 but remains over the windows 100 and 102 in the cassette 12. The particular film unit 14 positioned in alignment with the window 88 may be exposed by releasing the latch 42 to erect the cover 32 and depressing the shutter button 58.

After exposure, the cover 32 is closed and the film unit carrier or turret disc 70 is rotated through one indexed position thus causing the exposed film unit to be moved relative to the spreader bar 92. As a result of this movement and as shown in FIGS. 8 and 9 of the drawings, the processing fluid pod 112 of the exposed film unit is ruptured and the processing fluid contained therein spread throughout the image receiving area 108 of the film unit as the latter is advanced past the spreader bar 98. During this movement of the turret 70 the blind 116 is allowed to remain in a position covering the viewing windows 100 and 102 in the cassette 12.

After a suitable time has elapsed during which the processing fluid has had an opportunity to react to the photosensitive chemicals of the exposed film unit 14, the blind 116 may be rotated further to uncover the windows 100 and 102. At this time, the adjoining film unit will be in alignment with the exposure opening 88 but protected against light by the shutter 54 and the light-tight housing established by the camera 10.

The time required for the processing fluid to complete its function is very short and in some films may be less than the time required to advance the turret between indexed positions. In such cases, the blind 116 may be left in its fully retracted position for the exposure, processing and viewing of each successive film unit 14. Where longer imbibition periods are required, the blind is repositioned to close the viewing window after each exposure or at least before each processing. After all of the film units in a cassette have been exposed and processed, the cassette 12 is removed from the camera 10 for subsequent viewing in appropriate projection equipment (not shown).

Figure 10:
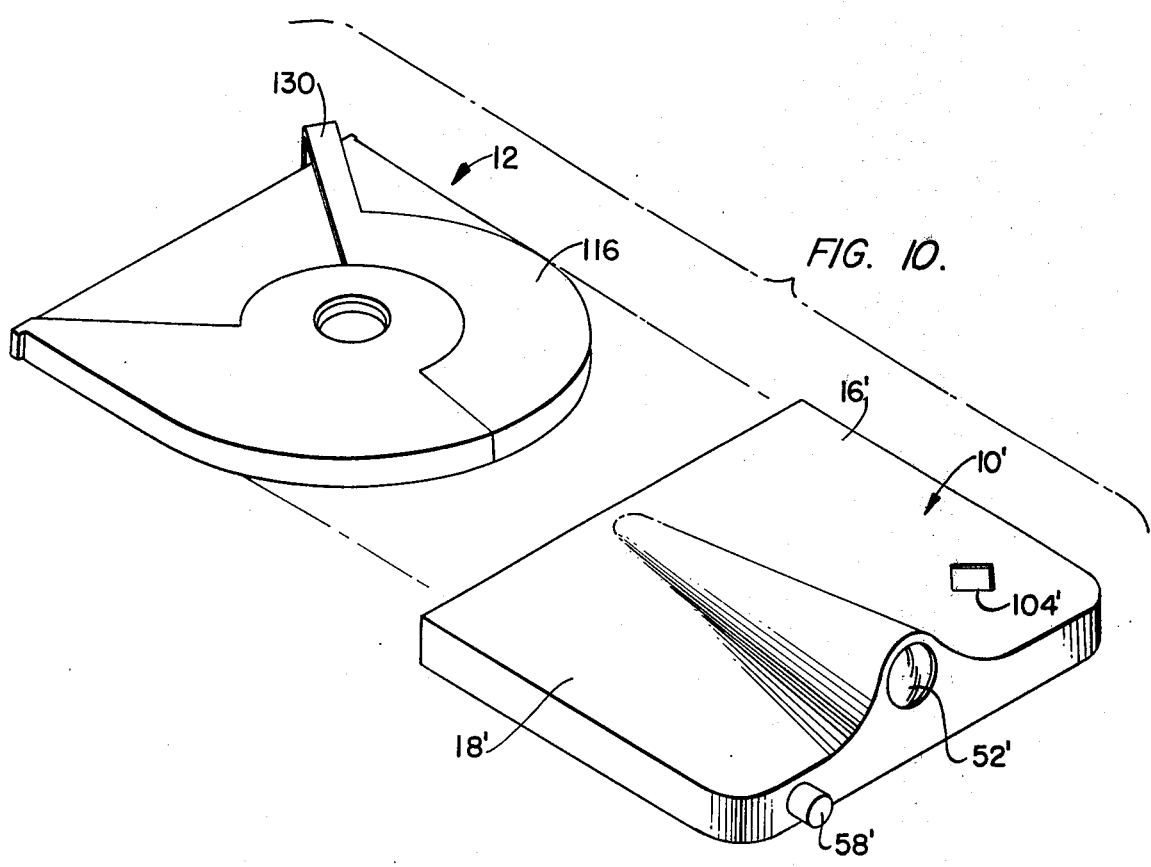
FIG. 10 is an exploded perspective view showing a modified embodiment.
Figure 11:
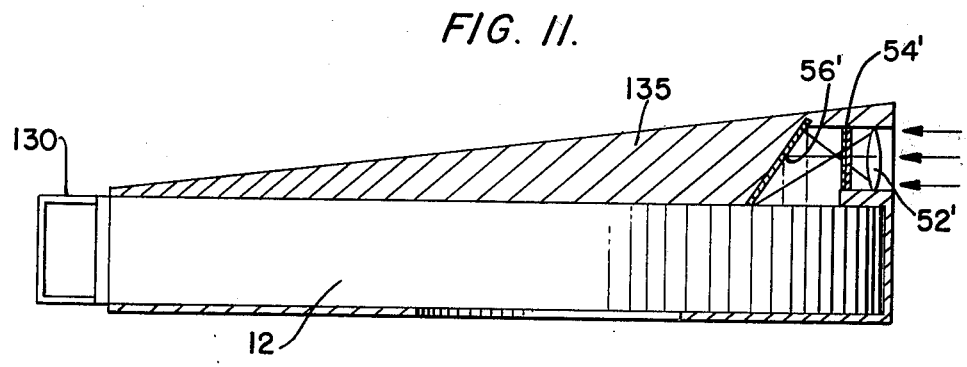
FIG. 11 is a longitudinal cross-section, similar to FIG. 3, but of the embodiment shown in FIG. 10.

In FIGS. 10 and 11 of the drawings, an alternative camera embodiment is illustrated. Since the cassette 12 described above is usable directly with the alternative camera embodiment shown in these figures no further description thereof will be given. Also, parts of the modified camera corresponding to parts in the previous embodiment are identified by identical reference numerals which are primed.

Thus it will be noted that the alternative camera embodiment 10' again includes a thin housing 16' open at its back to receive the cassette 12. In this instance, however, the housing 16' is an integral or non-folding structure in which the optical system including the lens 52', the shutter 54' and the mirror 56' are housed in a projection 135 formed in the top wall 18' of the housing 16'. A viewing window 104' is again provided in a position displaced by one index position of turret rotation within the cassette 12. Thus, apart from the foldable feature of the previous embodiment, the embodiment of FIGS. 10 and 11 is the same in all respects with the previously described embodiment.

It should be understood that while not shown in the illustrations, a viewfinder system for composing and framing the scene image would generally be included in the cameras of FIGS. 1 and 2. The viewfinder, for example, could take the form of a conventional viewfinder extended along either planar surface or one of the side edges.

Thus it will be seen that as a result of the present invention a highly effective miniaturized photographic system is provided and by which the objects of the invention are completely fulfilled. It will be apparent to those skilled in the art from the preceding description that variations may be made in the embodiments disclosed without departure from the present invention. Accordingly, it is expressly intended that the foregoing description is illustrative of a preferred embodiment only, not limiting, and that the true spirit and scope of the present invention be determined by reference to the appended claims.

What is claimed is:
1. A photographic apparatus comprising:
   a camera having a housing to provide a light-tight chamber and an optical system for exposing a film unit to a light image of a subject to be photographed;
   a movable carrier insertable into said camera, said carrier coplanarly mounting a plurality of film units each providing, upon exposure and processing, a positive image transparency, a pod of processing fluid being located on said carrier in association respectively with each said film unit, each said film unit and its respective pod of processing fluid being supported by said carrier for movement therewith in said housing to an exposure position relative to said optical system and for subsequent movement from said exposure position to a viewing position spaced from said exposure position; and spreader means adapted to be fixed in said housing between said exposure position and said viewing position and operative to spread processing fluid from each said pod over the exposed area of its associated film unit during movement of said associated film unit from said exposure position to said viewing position.

2. The apparatus recited in claim 1, wherein said viewing position is defined by aligned windows in said camera housing to permit passage of light through a positive transparency in said viewing position.

3. A photographic apparatus comprising:
a camera having a housing to provide a light-tight chamber and an optical system for exposing a film unit to a light image of a subject to be photographed;
a movable carrier and at least one film unit to provide upon exposure and processing, a positive image transparency, said film unit having a self-contained pod of processing fluid and supported by said carrier for movement in said housing to an exposure position relative to said optical system and for movement from said exposure position to a viewing position spaced from said exposure position;
a cassette to enclose said carrier and said film unit, said cassette being mountable as a unit in said housing and having an exposure window and a viewing window locatable in said exposure position and said viewing position respectively upon mounting said cassette in said housing; and
spreader means adapted to be fixed in said housing between said exposure position and said viewing position and operative to spread processing fluid from said pod over the exposed area of said film unit during movement thereof from said exposure position to said viewing position;
an exposure window and a viewing window locatable in said exposure position and said viewing position respectively upon mounting said cassette in said housing.

4. The apparatus recited in claim 3, wherein said carrier comprises a thin circular turret having a radial face to support a plurality of said film units at uniformly spaced angular intervals, said turret being rotatably supported within said cassette.

5. The apparatus recited in claim 4, including index means to position said turret in successively indexed positions at which said film units are located successively at exposure and viewing positions.

6. The apparatus recited in claim 5, wherein said turret is optically transparent and wherein said radial face supporting said film units is on the opposite side of said turret from said exposure window.

7. The apparatus recited in either of claims 4 or 5, wherein said camera housing is of generally parallelepiped configuration of a thickness slightly in excess of said turret and said cassette and wherein said optical system includes a lens and a mirror to reflect image defining light rays at right angles to the axis of said lens.

8. The apparatus recited in claim 7, wherein said housing includes a pivotal cover member movable between collapsed and erected conditions, said lens and said mirror being supported by said cover member.

9. The apparatus recited in claim 7, wherein said housing is an integral structure having a projecting portion to receive said optical system.

10. A photographic film cassette comprising:
an opaque housing having parallel top and bottom walls joined by sidewalls to provide an interior chamber;
a disc-like turret supported in said chamber for rotary movement about a central axis normal to said top and bottom walls, said turret having a pair of oppositely facing radial surfaces;
a plurality of film units presented at one of said radial surfaces, said units being spaced from said central axis by the same radial distance and being equally spaced angularly from each other, each of said film units including a self-contained pod of processing fluid at one marginal edge thereof;
means for rotatably advancing said turret through a plurality of index positions corresponding in number to the number of film units carried on said turret;
an exposure window in one of said top and bottom walls to be aligned with a film unit in one of said index positions;
a viewing window in at least one of said top and bottom walls, said viewing window being spaced from said exposure window by at least the angular spacing between said film units and said indexable positions;
processing means fixed within said housing at a position to cause said processing fluid to be spread across each film unit as it is moved upon rotary movement of said turret from said exposure window to said viewing window; and
adjustable blind means movable from a position covering at least said viewing window to a position retracted from said viewing window.

11. The apparatus recited in claim 10, wherein said turret is optically transparent and wherein said film units are presented at the radial surface of said turret opposite from the radial surface thereof adjacent said exposure window.

12. The apparatus recited in claim 11, wherein said processing means comprises a yieldable spreader bar supported in said bottom wall to engage said film units as they are moved from said exposure window to said viewing window.

13. The apparatus recited in claim 12, including a viewing window in each of said top and bottom walls, said viewing windows being aligned to permit passage of light through said film unit and said turret.

* * * * *